United States Patent [19]

Noensie et al.

[11] 4,270,775
[45] Jun. 2, 1981

[54] DEVICE FOR SEALING THE PLACE OF PENETRATION OF A PIPELINE IN THE WALL OF A SUBMERGED STRUCTURE

[75] Inventors: Nick Noensie, Lexington, Ky.; John N. Stanfield, Oslo; Paal Pettersen, Bergen, both of Norway

[73] Assignee: A/S Akers Mek. Versted, Oslo, Norway

[21] Appl. No.: 37,662

[22] Filed: May 10, 1979

Related U.S. Application Data

[62] Division of Ser. No. 941,731, Sep. 12, 1978.

[30] Foreign Application Priority Data

Sep. 21, 1977 [NO] Norway ................................. 773240
Feb. 24, 1978 [NO] Norway ................................. 780649

[51] Int. Cl.³ .......................................... F16L 35/00
[52] U.S. Cl. ........................................ 285/24; 285/55; 285/158; 285/192; 285/235; 405/169; 277/12; 277/44; 277/155; 277/167.3
[58] Field of Search ...................... 405/168, 169, 170; 166/343; 285/131, 132, 18, 24, 27, 158, 223, 231, 192, 55, 138, 49, 235; 277/12, 44, 155, 167.3

[56] References Cited

U.S. PATENT DOCUMENTS

| | | | |
|---|---|---|---|
| 899,623 | 9/1908 | Royer | 285/223 X |
| 1,383,424 | 7/1921 | Quinker | 285/192 X |
| 2,828,980 | 4/1958 | Craig et al. | 285/231 X |
| 3,967,462 | 7/1976 | De Jong | 166/343 |
| 4,009,584 | 3/1977 | Lamy | 405/169 |

FOREIGN PATENT DOCUMENTS

| | | | |
|---|---|---|---|
| 2741360 | 3/1978 | Fed. Rep. of Germany | 285/158 |
| 542208 | 12/1941 | United Kingdom | 285/49 |
| 261845 | 1/1971 | U.S.S.R. | 285/132 |

Primary Examiner—Dave W. Arola

[57] ABSTRACT

An axially flexible sealing device connecting two pipeline ends which comprises a number of sealingly connected annular members, each annular member including an inner cylindrical member, two spaced apart outer cylindrical members, and separate flexible ring members connecting the outer cylindrical members to the inner cylindrical member, each outer cylindrical member having a portion extending axially beyond the adjacent end of the inner cylindrical member when the attached flexible ring member is in an untensioned state. The sealing device is designed for use in connecting two pipelines located beneath sea level wherein the end of one of the pipelines is located in a hollow structure and one of the sealing devices is connected thereto, whereas the other end of the sealing device is sealingly connected to one end of a penetration sleeve which is sealingly connected through the wall of the structure (the other end of the sleeve being connected to the end of the other pipeline).

12 Claims, 19 Drawing Figures

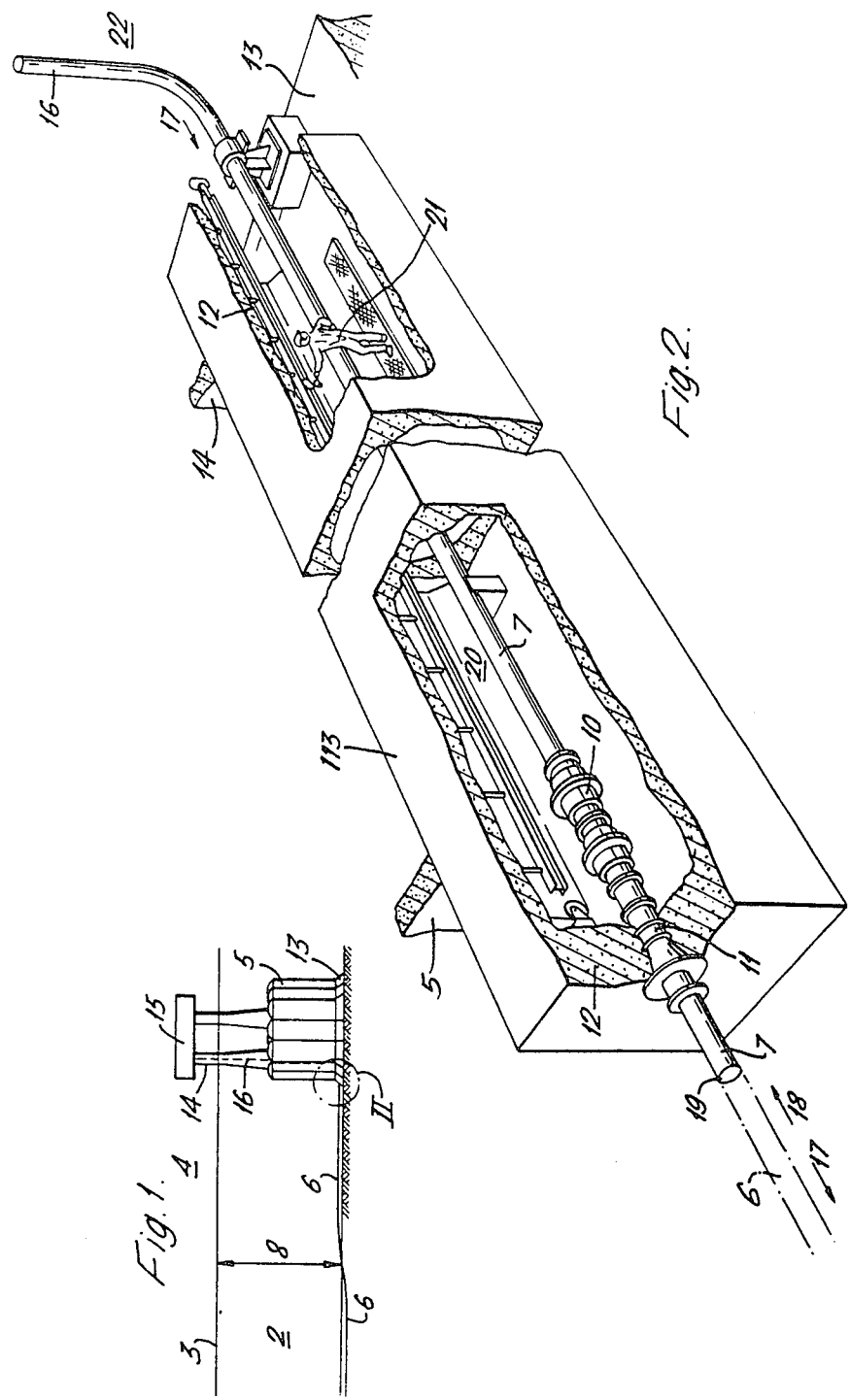

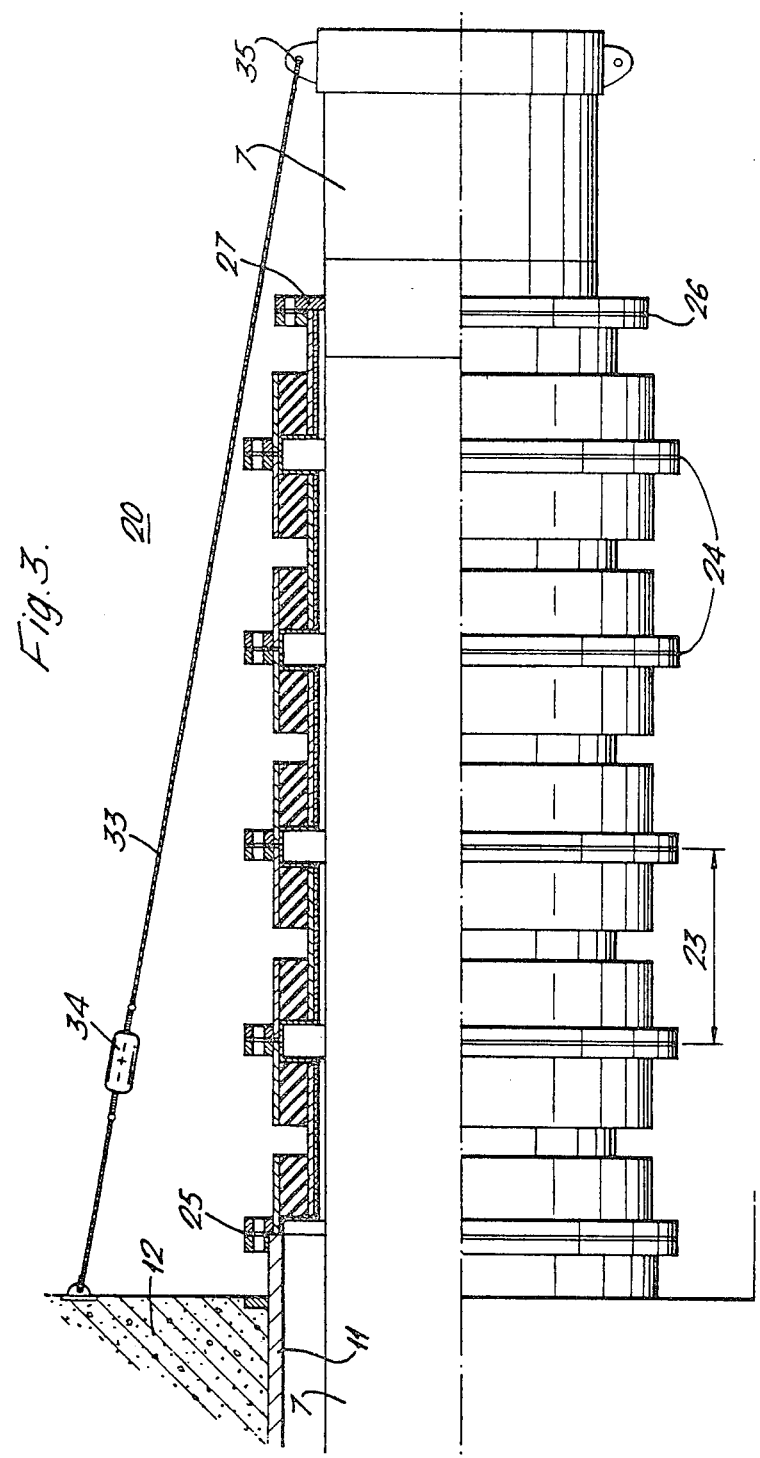

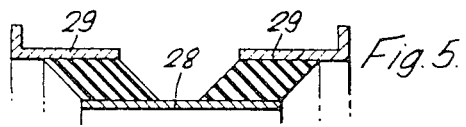
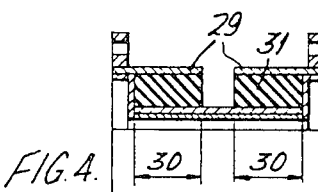
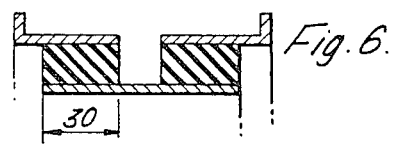
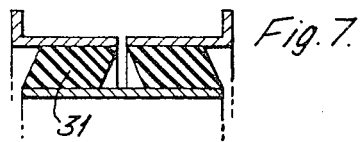
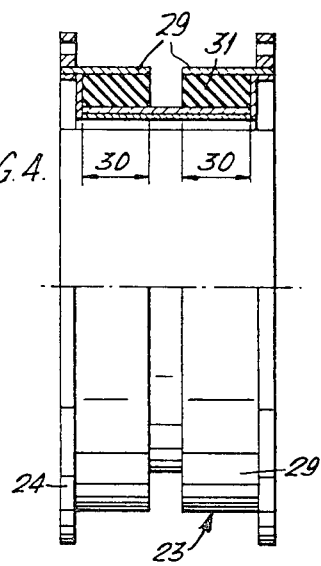
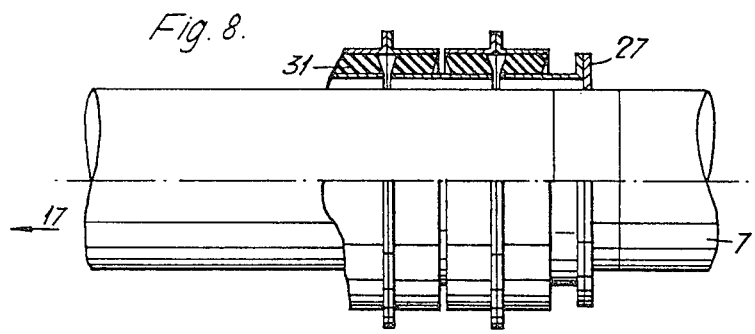
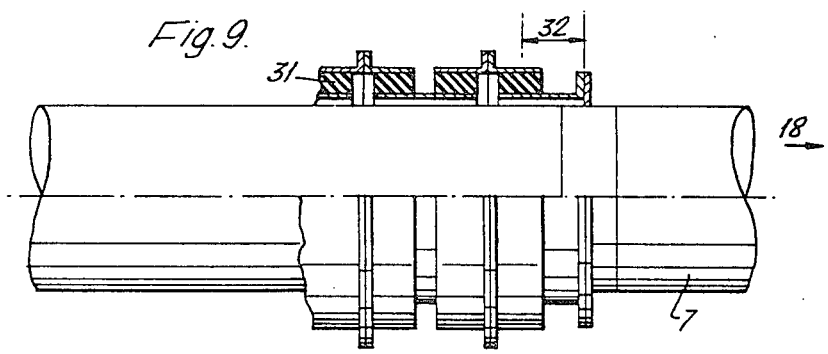

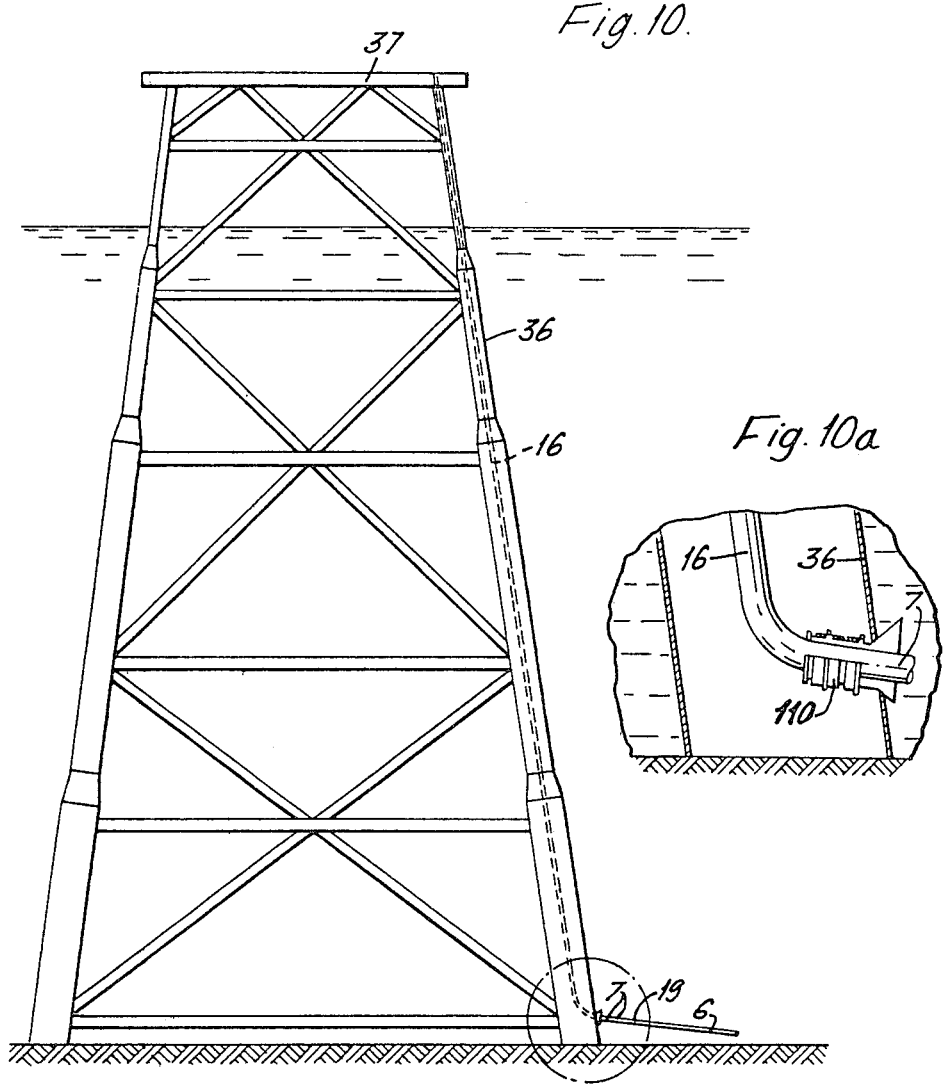

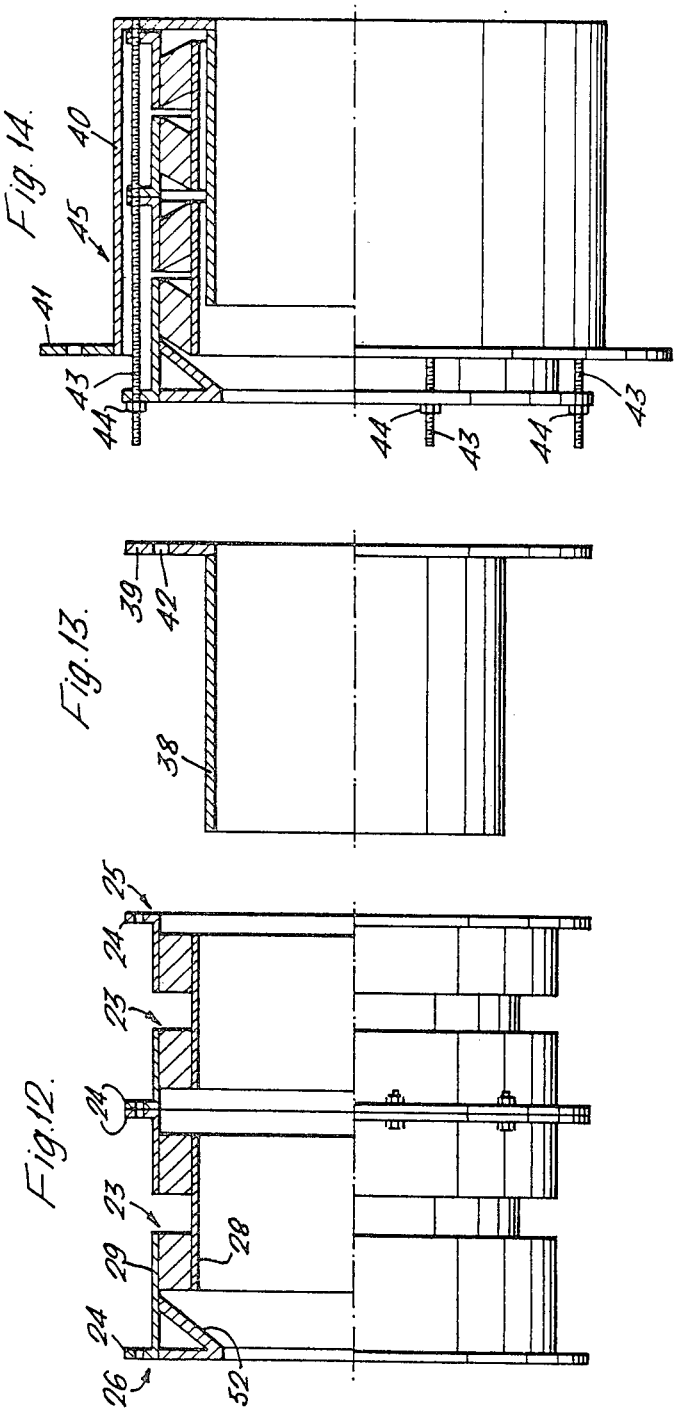

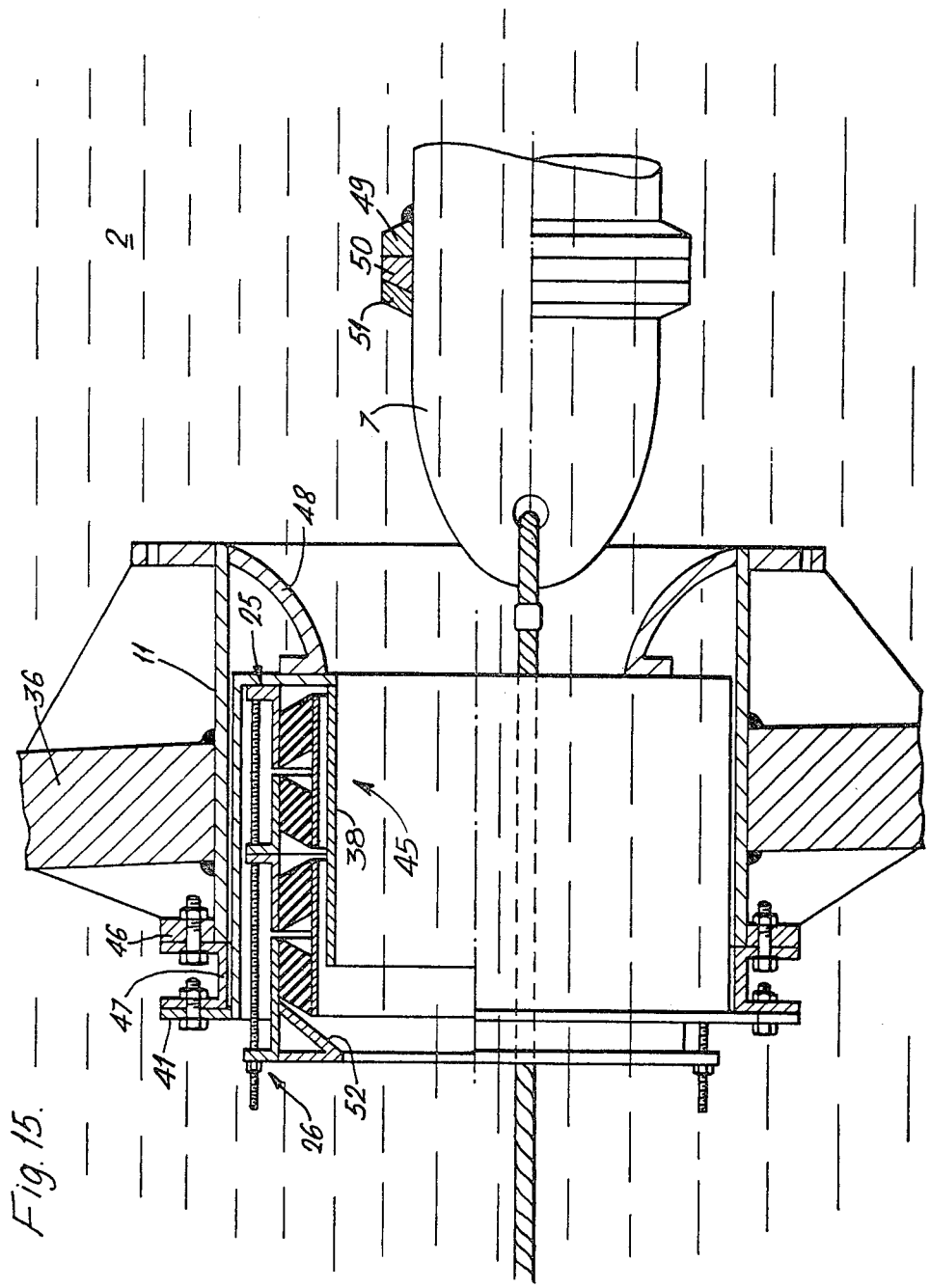

DEVICE FOR SEALING THE PLACE OF PENETRATION OF A PIPELINE IN THE WALL OF A SUBMERGED STRUCTURE

This is a division of prior application Ser. No. 941,731, filed on Sept. 12, 1978, of Nick Noensie et al for "METHOD AND APPARATUS FOR SEALING THE PLACE OF PENETRATION OF A PIPELINE IN THE WALL OF A SUBMERGED STRUCTURE."

BACKGROUND OF THE INVENTION

1. Field of the Invention

The present invention relates to a method and a device for sealing the place of penetration of a pipeline, especially in riser pipeline, in the wall of a submerged structure, which pipeline extends generally horizontally at the place of penetration and is connected to a generally vertical section inside the structure, wherein an annular sealing device which is flexible at least in the axial direction of the pipeline is placed coaxially with the pipeline at the place of penetration, one end of the sealing device being connected tightly to the wall while its other end is tightly connected to the pipeline.

2. Prior Art

One of the most desirable methods for transporting fluids like oil, gas, slurry, and water to and from offshore structures resting on the sea bed is through pipeline systems. The part of the pipeline system resting on the sea bed is called a submarine pipeline, while the part which is connected to the structure is called the riser.

The riser is vulnerable to many problems which range from corrosion and overstressing to damage caused by supply vessels. Because of these problems the riser is subjected to thorough design considerations. In order to avoid wave loads and damage due to supply vessels, there has been a tendency in resent years to place the riser inside the platform structure. This necessitates the penetration of the pipeline through the wall of the platform structure. The area inside the platform structure where the riser is located can either be a wet or dry environment. Since the riser is located inside the platform structure and thus is in the vicinity of areas where people work, any damage to the riser can cause loss of human life. In order to maximize safety, the riser inside the platform structure must be inspected periodically and minor damage repaired to avoid catastrophic failure.

Underwater inspection and repair of the riser in a confined space inside the platform structure are very hazardous operations. This space must therefore be capable of being dewatered in order to allow inspection and/or repair of the riser in a dry environment.

Therefore, whether the riser is in a dry or wet area, a safe sealing system must be provided at the place of penetration of the pipeline in the wall of the pipeline structure in order to ensure maximum safety during repair, maintenance and inspection.

Theree are situations where large relative movement takes place between the structure and the submarine pipeline. Such movements may be caused, for instance by, expansion of the pipeline due to temperature and/or pressure in the pipeline and movement of the structure due to external influences like waves, current, wind and soil deformation.

Large relative movements between the pipeline and the platform structure may thus give rise to high stresses and loads in the pipeline and in equipment and parts of the structure directly in the way of such movements, such as the seal and pipe support systems.

From U.S. Pat. No. 4,009,584 it is known to seal the place of penetration of a pipeline in the wall of a submerged structure, wherein the pipeline by casting is fixed to the wall of the structure at the place of penetration by means of epoxy or the like. The epoxy is said to be sufficiently flexible to absorb minor relative motion between the pipeline and the structure, that is, minor movemens on in the order of magnitude of a few centimeters. One can assume however, that there may occur forces between the pipeline and the structure which are high enough to destroy the epoxy joint. In order to safeguard against catastrophic results of such an occurrence, a safety seal can be arranged around the joint, which seal generally has the form of a stuffing box which is meant to prevent major leakage until the main seal can be repaired. In one of the embodiments shown the safety seal is connected to a bellow-like sleeve in order to give the safety seal a certain ability to move together with the pipeline without the occurrence of sliding motion—and thereby leakage—between these elements. However, the safety seal remains only a temporary emergency solution until the main seal can be repaired. Such a pipeline being rigidly held in or near the wall of the structure will readily be subjected to high loads at this place since it will serve as a fixed point when the pipeline seeks to move as a result of changes in temperature and/or pressure when the pipeline is put into service. These loads give rise to stresses which may be so high that danger of rupture results. Furthermore, such stresses can often lead to accelerated corrosion and cracking.

The object of the present invention is to provide a method and an apparatus of the type mentioned, whereby the above-mentioned drawbacks and deficiencies are generally avoided.

SUMMARY OF THE INVENTION

The method according to the invention thus permits the pipeline to move relatively freely at the place of penetration when subjected to temperature and/or pressure changes when being put in service. By letting both the sealing device and the vertical section of the riser pipeline be prestressed corresponding to the movement which is to be expected when the pipeline is put in service, neither the seal nor the pipeline will be subjected to deflection stresses of any magnitude in use, and the probability of a failure occurring in the critical area inside the platform structure will thereby be substantially reduced.

Since the sealing device may be built to any desirable length by putting together a sufficient number of seal elements according to the invention, the flexibility of the seal may be adapted to the expected movement of the pipeline at the place of penetration. The seal elements are of a very robust and simple design and are very resistant both to mechanical and chemical influence. Furthermore, the sealing device according to the invention is easy to install and does not invite incorrect assembly. Consequently, it satisfies generally all the requirements which may be imposed on such a sealing device.

For improved understanding of the invention, it will be described in greater detail with reference to the exemplifying embodiments shown in the drawings.

DESCRIPTION OF THE DRAWINGS

FIG. 1 shows schematically a platform structure resting on the sea bed and being penetrated by a pipeline.

FIG. 2 shows, partly in section, an enlarged view of the place of application of the invention at II of the structure in FIG. 1.

FIG. 3 shows, partially in section, a sealing device according to the invention during installation.

FIGS. 4–7 show sections through seal elements according to the invention in various load situations.

FIG. 8 shows partially in section a sealing device according to the invention after installation, but before the pipeline is commissioned.

FIG. 9 shows the sealing device in FIG. 8 after commissioning of the pipeline.

FIG. 10 shows an alternative application in a platform having a supporting structure of steel.

FIG. 10a shows an enlarged view of the penetration point in the platform leg of the pipeline.

FIGS. 12 and 13 show axial sections of some of the components of the sealing device in FIG. 11.

FIG. 14 shows the parts in FIGS. 12 and 13 installed together with a further component of the sealing device.

FIGS. 15 and 16 show the sealing device in FIG. 14, partially in section, during two phases of installation of a pipeline.

DETAILED DESCRIPTION OF THE PREFERRED EMBODIMENTS

Figure 11:
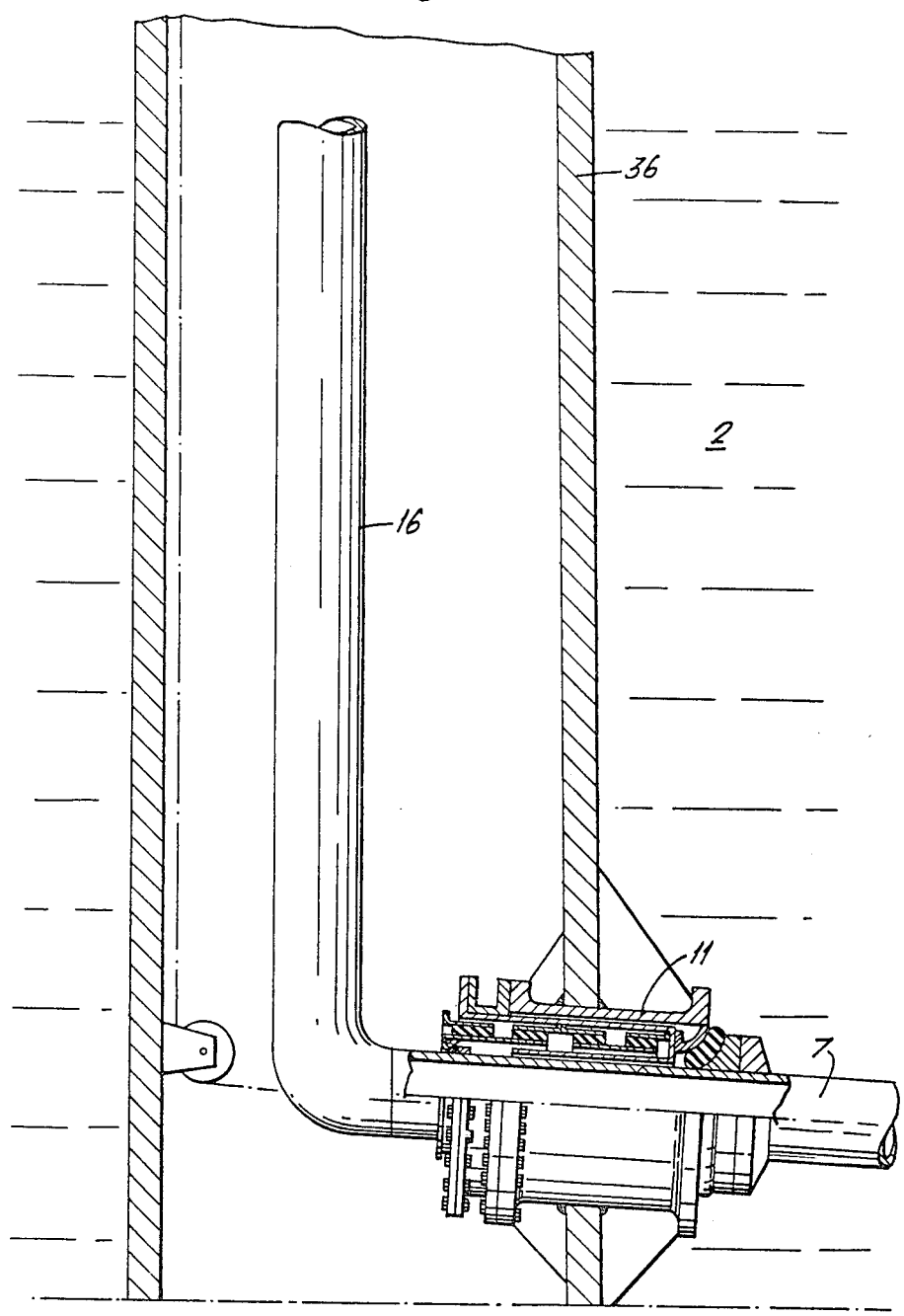
FIG. 11 shows an alternative examplifying embodiment of the invention, partially in section, used in close quarters.

The structure 5 shown in FIGS. 1 and 2 is partially submerged in water 2. The deck 15 of the structure 5 is situated in the atmosphere 4 above the water surface 3. The base 13 of the structure rests on the sea bed. The water depth 8 may vary; however, the present invention may be used at water depths of 150 m or more.

As shown in FIG. 2, a submarine pipeline 6 is connected to the riser pipe 7 at point 19. The riser 7 penetrates the wall 12 of a passage 113 in the base 13 of the structure 5 through a penetration sleeve 11. A seal 10 keeps water 2 out of the areas 20 and 22 inside the structure 5, so that inspection and repair work may be performed as indicated in FIG. 2 by means of a worker 21.

The riser 7 extends generally horizontally from the connection point 19 outside the structure 5 to the area 22 inside a column 14 of the structure. Here the riser extends generally vertically with a section 16 up through the column to the deck 15 of the structure. The seal 10 permits the riser 7 to move in the direction of the arrows 17 and 18 while maintaining the sealing action.

FIG. 3 shows the seal 10 in greater detail. The seal consists of a plurality of individual seal elements 23 which are bolted together by means of flanges 24 into a row which forms the complete sealing device. One end 25 of the sealing device 10 is bolted to the penetration sleeve 11, while the other end 26 is bolted to a flange 27 which is welded to the riser pipe 7 to effect a permanent seal.

Each seal element 23 consists, as is apparent from FIG. 4, of an inner cylinder 28 and two outer cylinders 29 of larger diameter and each overlapping an end of the inner cylinder 28, and two rings 31 of elastomer material which is placed in between each of the overlapping parts 30 of the cylinders. The elastomer rings 31 are bonded to the walls of the cylinders 28 and 29. The two elastomer rings 31 in each seal element 23 can allow relative movement between the cyliners, as suggested in FIGS. 5, 6 and 7. FIG. 6 shows the inner cylinder 28 and the outer cylinder 29 in unstressed condition without any displacement therebetween. FIG. 5 shows the outer cylinders 29 displaced away from each other, while FIG. 7 shows the outer cylinders 29 displaced towards each other.

The total relative displacement between the ends 25 and 26 of the sealing device 10 can be given any desirable magnitude by simply adjusting the number of individual seal elements 23 to be bolted together.

The thick elastomer rings 31 connecting the inner cylinder and the outer cyliners 29 will not easily be subjected to mechanical damage, and they will therefore be able to resist quite a high differential pressure. Thus, the sealing device 10 will give a high degree of safety during its entire lifetime.

The elastomer rings 31 may be made of synthetic rubber having a hardness of 65 Shore A.

When the pipeline is in operation, the pressure and/or temperature of the fluid conveyed in the submarine pipeline 6 and the riser 7, 16 during normal circumstances give a substantially permanent displacement of the riser 7, 16 and the seal 10 of magnitude 32 in the direction of the arrow 18 in FIGS. 2 and 9. In order to eliminate sustained stresses in the elastomer rings 31 and the riser 7, 16 due to this displacement 18, the riser and the seal 10 is displaced or prestressed an equivalent distance 32 in the opposite direction 17 before the pipeline sections are welded together.

This may be achieved, e.g., by means of a number of rods 33 attached between the wall 12 and a point 35 on the riser 7. By tightening turnbuckles 34 in the rods 33 the riser will be displaced a corresponding distance 32 in the direction of the arrow 17, and concurrently the elastomer rings 31 will be compressed or prestressed the same amount, as indicated in FIG. 8.

When the pipeline sections have been completely connected to each other and the pipeline has been activated, i.e., a fluid is flowing through the pipeline system 6, 7, 16, the rods 33 are removed so that the riser 7 and the seal 10 are allowed to move in the direction 18 a distance 32, as indicated in FIG. 9. This brings the elastomer rings 31 back to their undeformed condition, and concurrently the bending stresses originating in the vertical riser section 16 during prestressing of a seal, are reduced. The length of the horizonal section 7 of the riser between the seal 10 and the vertical section 16 is small enough that thermal expansion of this section 7 will have insignificant effect on the stresses in the vertical section 16. According to the invention both the seal 10 and the riser 7, 16 during normal operating conditions are subjected to the lowest possible loads. This is of major importance for the safety and useful life of the installation.

The individual seal elements 23 may on one or more sides be equipped with a coating for protection against corrosion and/or for giving electrical isolation. Thus, the elements shown in FIGS. 3 and 4 are equipped with a rubber coating on the side facing inwards towards the pipeline.

FIG. 10 shows a sealing device 110 in accordance with the invention applied on a riser pipe 7 which extends into a leg 36 of a steel supporting structure for a platform 37.

FIG. 11 shows a riser pipe, the horizontal section 7 of which extends through the wall 36 of a hollow column of a steel structure. This riser pipe continues in a vertical section 16 inside the column. At the place of penetration a penetration sleeve 11 is welded to the wall 36 of the column. Between the penetration sleeve 11 and the riser pipe 7 is installed a sealing device according to the invention, here in a form requiring little space inside the column.

The design of this sealing device will be apparent from FIGS. 12–14. FIG. 12 shows a flexible body consisting of two seal elements 23 which are bolted together at adjacent flanges 24. The flexible body is placed on to a cylinder 38 which at one end is equipped with a flange 39. The flange 39 is bolted together with the adjacent flange 24 of the flexible body. Thereafter the outer cylinder 40 is placed on to the flexible body and attached rigidly and tightly at one end to the flange 39, for instance by welding. The other end of the outer cylinder 40 is equipped with a flange 41. The flanges 24 of the flexible body are equipped with holes 42 in addition to the bolt holes, and in the one of these flanges which are attached to the flange 39, these holes have a somewhat smaller diameter and are internally threaded for attachment of prestressing bolts 43 introduced through the larger holes in the other flanges 24. The prestressing bolts 43 are also equipped with threads at their opposite, free ends, and nuts 44 are screwed onto these ends. By tightening these nuts the flexible body will be compressed, as is apparent from FIG. 14. This figure further shows that the inner cylinder 38, the flange 39 and the outer cylinder 40 together form a protective housing 45 for the flexible body.

In FIG. 15 the housing 45 is shown, together with the flexible body in compressed condition, installed in a penetration sleeve 11. The flange 41 of the housing is attached to an inner flange 46 on the penetration sleeve via a distance piece 47. The length of the distance piece 47 is adapted to the length of the housing 45 so that its annular bottom plate 39 is located adjacent to a generally funnel-shaped guide 48 arranged at the outside end of the penetration sleeve 11. The guide is preferably formed so that the inner wall 38 of the housing forms an extension thereof without stepwise transitions.

Figure 16:
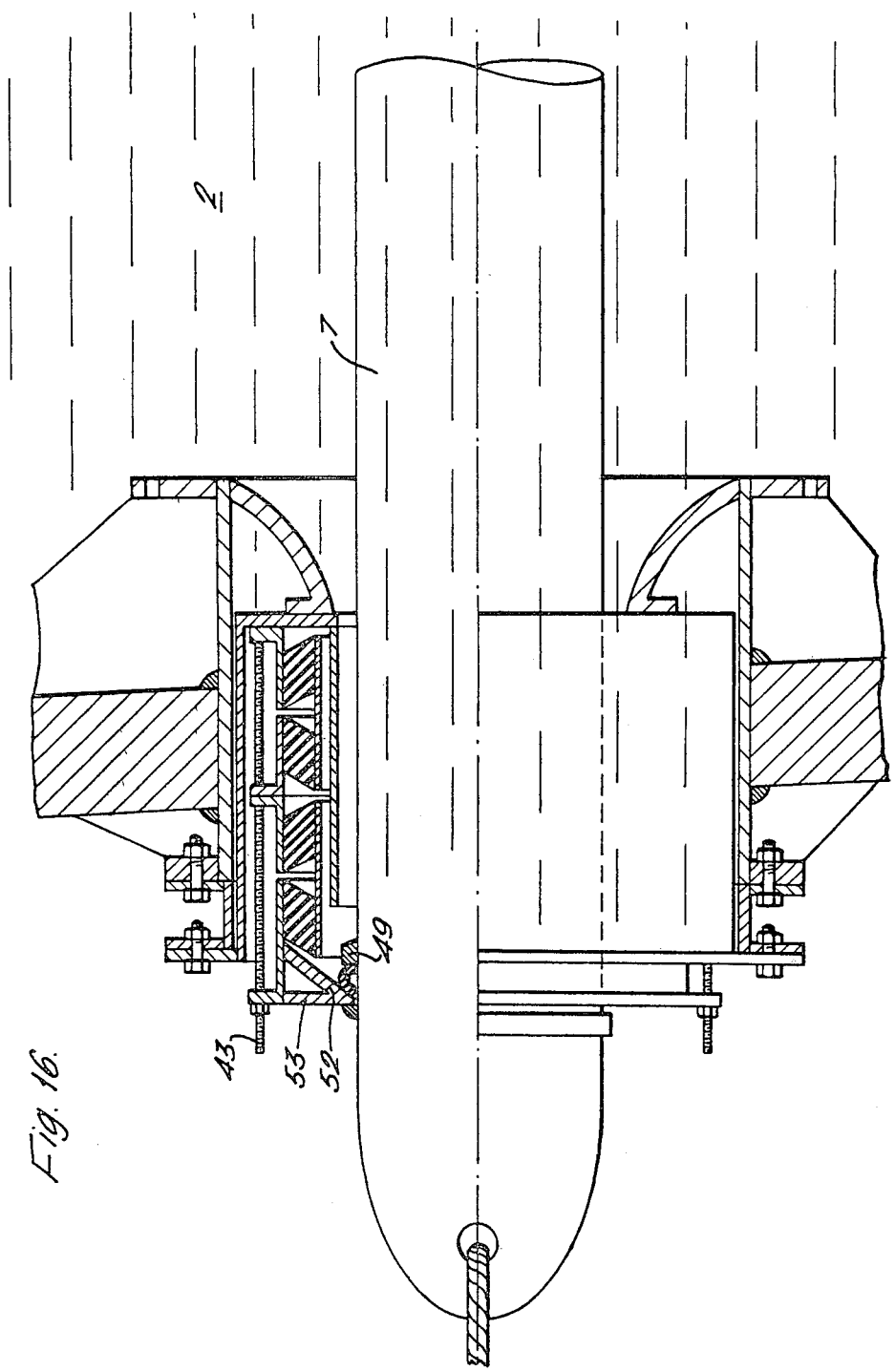
Figure 18:
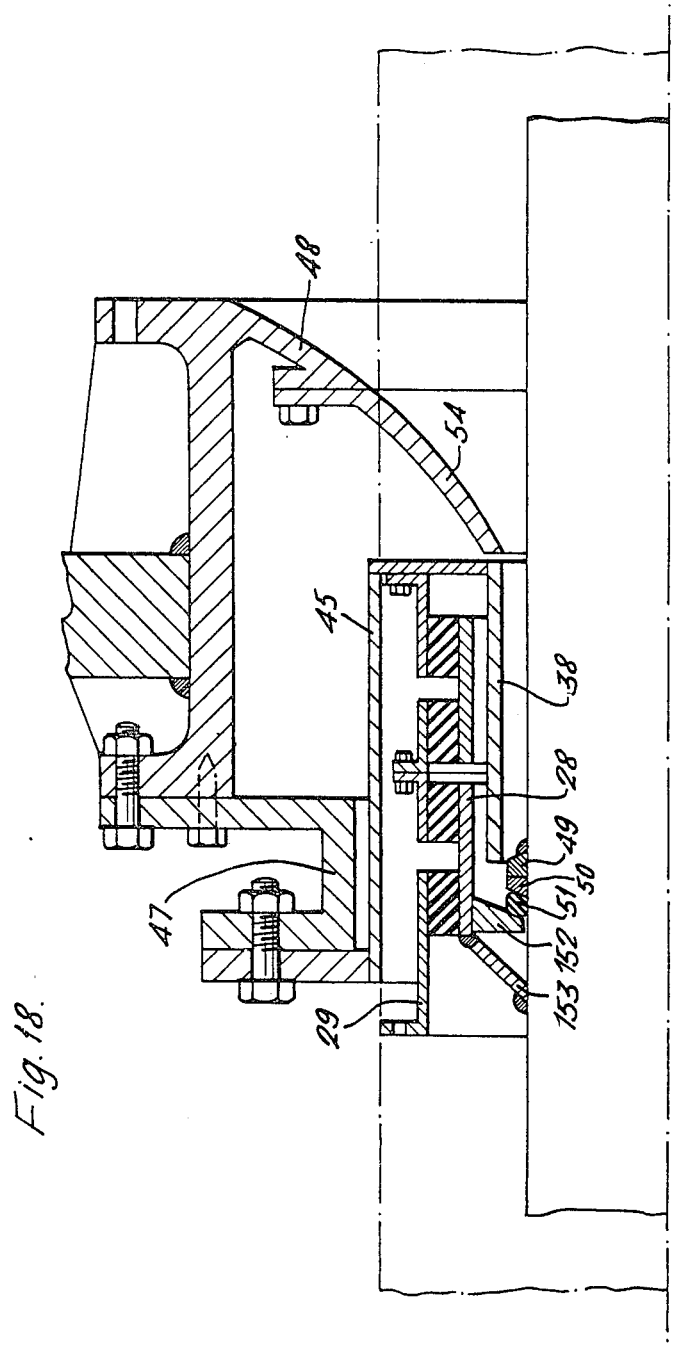
FIG. 18 shows a further sealing device according to the invention applied for a pipeline having substantially smaller dimension than the maximum possible.

FIG. 15 also shows the end of a pipe 7 in the process of being pulled through the penetration sleeve 11 and the sealing device. The pipe end is equipped with a fixed ring 49, against which is resting a loose ring 50. An elastic seal 51 is attached to the loose ring 50. During pulling in of the pipe end the seal 51 will be brought into contact with a rest 52 fixed to the inwardly facing surface on the flexible body. A temporary seal will hereby be formed, permitting water to be pumped out from the inside of the column in order for the sealing device according to the invention to be attached permanently to the pipe. This is done by attaching a connecting piece 53 between the flexible body and the pipe, for instance by welding. As shown in FIG. 18, the connecting piece 153 may preferably have a conical portion in order to reduce bending stresses. After the connecting piece has been installed, the prestressing bolts 43 (FIG. 16) are removed, and the flexible body may now follow movements of the riser pipe 7 with respect to the column wall 36.

Figure 17:
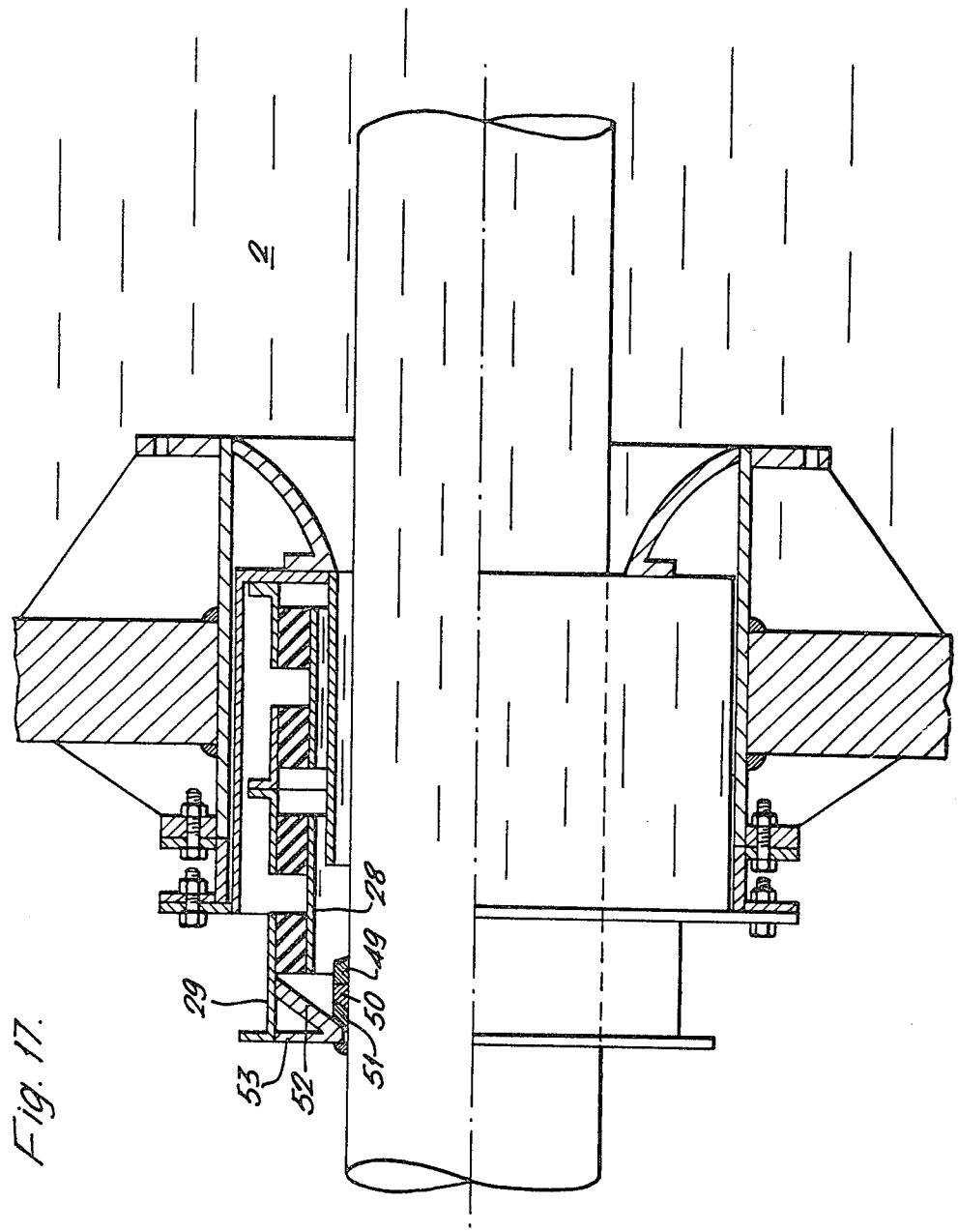
FIG. 17 shows the sealing device in FIGS. 15 and 16 following completed pipeline installation.

FIG. 17, and 18 show the condition of the flexible body when the riser pipe 7 has moved inwards the expected amount, for instance due to thermal expansion.

The sealing device according to the invention may easily be adapted to pipelines having smaller diameter than the largest pipelines which during the design stage have to be expected and therefore will be decisive for the diameter of the penetration sleeve 11. At this point it will often not be possible to know the exact number and dimension of the pipelines that will have to be connected to the structure when it has been placed on the sea floor. It is therefore necessary to provide sufficiently many penetration sleeves with sufficiently large diameter in order to be able to cover the actual situation at a later stage. Should it become desirable to install a pipeline having substantially smaller diameter than expected, the penetration sleeve may easily be adapted to the new pipe dimension by means of the sealing device according to the invention. An example of such adaptation is shown in FIG. 18. The distance piece 47 is here given a smaller internal diameter than the sleeve 11 so that a housing 45 for the flexible body adapted to the particular pipe dimension easily may be attached. Furthermore, the funnel-shaped guide 48 is equipped with an extension piece 54 which is formed so as to avoid a step transition between the guide and the inner wall of the housing. This is of importance for avoiding problems during pulling in of the pipe and for avoiding unnecessary damage to the seal 51. In order to further reduce the risk of such damage, the seal 51 may alternatively be fixed to the rest 152 instead of sitting on the pipe 7. In FIG. 18 the rest 152 is shown to be arranged on the lower cylinder 28 of the element 23. This positioning will usually be entirely satisfactory, especially by smaller pipe dimensions. By larger pipe dimensions, and especially when there is danger that the pipes may be pulled in somewhat misaligned with the axis of the penetration sleeve, it will usually be advantageous to arrange the rest 152 and possibly the seal 51 on the outer cylinder 29. Thus, the prestressing bolts 43 may be used to adjust the seating of the seal against the ring on the pipe and this way stop any leakage due to insufficient alignment between these cooperating parts.

We claim:

1. A connecting system for sealing the penetration point at which a pipeline passes through a hole in a wall of a structure located beneath the surface of a body of water, said hole including a penetration sleeve sealingly passing therethrough, and the pipeline having a fixed annular ring positioned therearound near the hole in the wall, said system including:

a hollow outer cylindrical connection sleeve which is extendable through the hole in said wall of said structure and within said penetration sleeve, one end of said outer connection sleeve including an outwardly extending flange means sealingly connected to said penetration sleeve and the other end including an inwardly extending flange means, a hollow inner cylindrical sleeve positioned within said outer cylindrical sleeve, said inner cylindrical sleeve being connected to said inwardly extending flange means of said outer cylindrical connection sleeve, and an axially flexible sealing device connected to said inwardly extending flange means of said outer cylindrical sleeve and positioned to extend inbetween said outer cylindrical sleeve and said inner cylindrical sleeve, said sealing device comprising at least one annular member, each annular member including an axially extending inner cylindrical member, at least one outer cylindrical member and a flexible ring member connecting each said outer cylindrical member to said inner cylindrical member, each said outer cylindrical member being positioned about said inner cylindrical member such that with each said flexible ring member in an untensioned state, each said outer cylindrical member will be separated from one another and will have a portion which extends in an axial direction beyond the adjacent end of said inner cylindrical member, the outer cylindrical member of said annular member located farthest from said inwardly extending flange means of said outer cylindrical sleeve including an inwardly extending stop means for sealing abutment with said fixed annular ring of said pipeline.

2. The connecting system of claim 1 wherein each annular member of said axially flexible sealing device includes two outer cylindrical members positioned about each said inner cylindrical member, each said outer cylindrical member having a portion which extends in a axial direction beyond an opposite end of the respective inner cylindrical member when the flexible members which connect each outer cylindrical member to the respective inner cylindrical member are in untensioned states, and wherein each of said outer cylindrical members of each annular member include means for sealing attachment to one another and to, respectively, the pipeline end and said inwardly extending flange means of said outer cylindrical sleeve.

3. The connecting system of claim 2 wherein a rubber coating is located on the inside wall of each said inner cylindrical member of each annular member, on the inside walls of each said outer cylindrical members on the portions thereof which extend axially beyond the adjacent ends of said inner cylindrical member and on the portions of each said flexible ring members which are exposed to the hollow cylindrical area defined by said cylindrical members.

4. The connecting system of claim 2 wherein each said sealing attachment means for each outer cylindrical member of each annular member comprises a flange with a hole means therein and connecting bolts passing therethrough to connect adjacent flanges together.

5. The connecting system of claim 2 wherein said axially flexible sealing device comprises a multiplicity of annular members sealingly connected together.

6. The connecting system of claim 2 wherein said flexible ring members in each said annular member are composed of synthetic rubber having a hardness of about 65 Shore A.

7. The connecting system of claim 2 including means for compressing the axial extension of said sealing device.

8. The connecting system of claim 7 wherein said compressing means comprises a threaded elongated bolt which is connectable to and extendable between said inwardly extending flange means of said outer cylindrical sleeve and an outwardly extending flange on the outer cylindrical member of said sealing device located farthest from said inwardly extending flange means of said outer cylindrical sleeve, and a nut means threadably engageable with said elongated bolt to compress the outer cylindrical members of all said annular members together.

9. The connecting system of claim 2 wherein one end of the penetration sleeve includes a guide in the form of a generally funnel-shaped inwardly-extending flange means.

10. The connecting system of claim 9 wherein said penetration sleeve includes a flange means at the end thereof opposite said one end, and wherein a generally U-shaped adaptor means is connected between said flange means of said penetration sleeve and said outwardly-extending flange means of said outer connection sleeve.

11. The connecting system of claim 10 wherein said generally U-shaped adaptor means has one leg longer than the other, the longer leg being connected to said flange means of said penetration sleeve, and wherein a funnel-shaped extension means is connected to said funnel-shaped inwardly extending flange means of said outer cylindrical member.

12. The connecting system of claim 2 wherein a loose ring and an elastic seal means are positioned between said inwardly extending stop means and said fixed annular ring on said pipeline.

* * * * *